Figure 1:
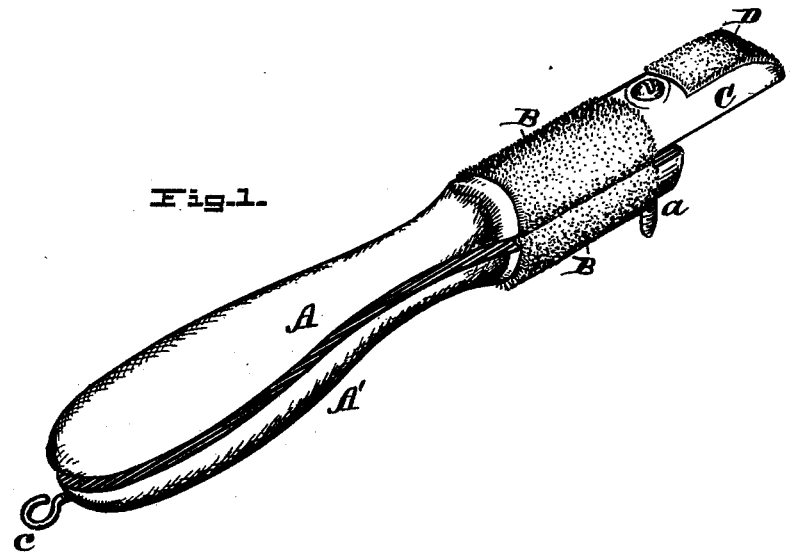
Figure 2:
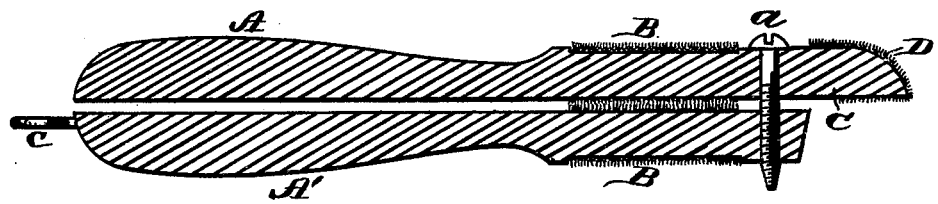

L. K. DUTTON.
CUTLERY SCOURER.

No. 188,786. Patented March 27, 1877.

WITNESSES:
Jas. F. DuHamel
H. B. Brown

INVENTOR:
Leander K. Dutton
PER
H. J. Abbot.
ATTORNEY.

N. PETERS, PHOTO-LITHOGRAPHER, WASHINGTON, D. C.

UNITED STATES PATENT OFFICE.

LEANDER K. DUTTON, OF OSKALOOSA, IOWA.

IMPROVEMENT IN CUTLERY-SCOURERS.

Specification forming part of Letters Patent No. 188,786, dated March 27, 1877; application filed September 13, 1876.

*To all whom it may concern:*

Be it known that I, LEANDER K. DUTTON, of Oskaloosa, in the county of Mahaska and State of Iowa, have invented certain new and useful Improvements in Knife and Fork Cleaners, of which the following is a specification:

The nature of my invention consists in the construction and arrangement of a knife and fork cleaner, as will be hereinafter more fully set forth.

In order to enable others skilled in the art to which my invention appertains to make and use the same, I will now proceed to describe its construction and operation, referring to the annexed drawing, which forms a part of this specification.

The handle of my knife and fork cleaner is made in two parts, A A', of any suitable form and size. In practice the whole handle will be turned or otherwise made in one piece, and then split longitudinally in the center, so that the two parts will be exactly alike. The two parts A A' of the handle are united together by a screw, a, which acts as a pivot, and also admits of the parts being tightened as much as required. Around each of the parts A and A', near the pivoted end, is wrapped and fastened pieces B B of cloth, carpet, emery paper, or other suitable material, as shown. When cloth or its equivalent is used suitable polishing-powder must be placed between the two rubbers B B.

The part A is so constructed as to project out beyond the part A', as shown at C. The end of the projection is so formed as to adapt it to fit the concave surface of a spoon or other similar article. The projection is covered with a piece of cloth, D, of carpet, &c.

The knife-blade is passed between the two parts B B, and drawn back and forth with one hand, while with the other the handle is compressed, so as to give any desired pressure on the blade. The knife is thus cleaned on both sides at one time. The rubbers B are placed in grooves on the two parts of the handle, and can be glued or otherwise fastened, as desired.

The tines of a fork can be cleaned in the same manner as a knife-blade, while the crooked parts of the forks can be cleaned on the outsides of the rubbers.

In the end of one of the parts A of the handle is a screw-eye, c, for convenience in hanging up the knife-cleaner.

Having thus fully described my invention, what I claim as new, and desire to secure by Letters Patent, is—

1. The combination of the bisected handle A A', the rubbers B B, and the pivoting-screw a, substantially as and for the purposes herein set forth.

2. The combination of the bisected handle A A', one of the parts projecting beyond the other part, and provided with a rubber, D, with the rubbers B B and screw a, substantially as and for the purposes herein set forth.

In testimony that I claim the foregoing as my own I affix my signature in the presence of two witnesses.

LEANDER K. DUTTON.

Witnesses:
M. E. BENNETT,
BEN. McCOY.